(12) United States Patent
Kabrt et al.

(10) Patent No.: US 8,970,423 B2
(45) Date of Patent: Mar. 3, 2015

(54) HELICOPTER COLLISION-AVOIDANCE SYSTEM USING LIGHT FIXTURE MOUNTED RADAR SENSORS

(71) Applicant: Honeywell International Inc., Morristown, NJ (US)

(72) Inventors: Tomas Kabrt, Prague (CZ); George Papageorgiou, Toulouse (FR); Jean-Luc Derouineau, Cornebarrieu (FR); Michal Orlita, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 370 days.

(21) Appl. No.: 13/706,858

(22) Filed: Dec. 6, 2012

(65) Prior Publication Data

US 2014/0062755 A1    Mar. 6, 2014

Related U.S. Application Data

(60) Provisional application No. 61/653,297, filed on May 30, 2012.

(51) Int. Cl.
  *G01S 13/93*     (2006.01)
  *G01S 7/00*      (2006.01)
  (Continued)

(52) U.S. Cl.
  CPC ............ *G01S 13/9303* (2013.01); *G01S 7/003* (2013.01); *G01S 13/87* (2013.01); *G01S 13/94* (2013.01)
  USPC .............................................. 342/29; 342/52

(58) Field of Classification Search
  CPC ..... G01S 13/9303; G01S 7/003; G01S 13/87; G01S 13/94
  USPC ................. 342/27, 29–36, 52–54, 56–58, 65; 340/945–946, 961, 982
  See application file for complete search history.

(56) References Cited

U.S. PATENT DOCUMENTS 5,351,032 A * 9/1994 Latorre et al. ................ 340/983
6,047,165 A   4/2000 Wright et al.
(Continued)

FOREIGN PATENT DOCUMENTS

| EP | 1787142 B1 | 11/2008 |
| EP | 2187372 B1 | 9/2011 |
| WO | 2010135306 A1 | 11/2010 |

OTHER PUBLICATIONS

International Search Report and Written Opinion from the counterpart International Application No. PCT/US2013/042972, dated Mar. 5, 2014, 11 pp.

(Continued)

*Primary Examiner* — John B Sotomayor
(74) *Attorney, Agent, or Firm* — Shumaker & Sieffert, P.A.

(57) ABSTRACT

A helicopter collision-avoidance system is disclosed. An exemplary system includes at least one lamp, such as a light emitting diode (LED) lamp, an incandescent lamp, a halogen lamp, an infrared lamp, or the like; a radar emitter configured to emit a radar signal; a radar detector configured to receive a radar return signal associated with reflections of the emitted radar signal that are reflected from an object; and a radio frequency (RF) system configured to wirelessly transmit radar information associated with the received radar return signal to a radar information receiver configured to receive the wirelessly transmitted radar information. The light module is located at one of a plurality of light positions on an external surface of a helicopter.

20 Claims, 4 Drawing Sheets

(51) Int. Cl.
*G01S 13/87* (2006.01)
*G01S 13/94* (2006.01)

(56) References Cited

U.S. PATENT DOCUMENTS

| | | | |
|---|---|---|---|
| 6,118,401 | A | 9/2000 | Tognazzini |
| 6,789,016 | B2* | 9/2004 | Bayh et al. ............... 701/301 |
| 6,941,204 | B2 | 9/2005 | Halm et al. |
| 7,055,994 | B2 | 6/2006 | Martin |
| 7,188,983 | B2 | 3/2007 | Dunn |
| 7,379,165 | B2 | 5/2008 | Anderson et al. |
| 7,463,183 | B2 | 12/2008 | Reich |
| 7,579,980 | B2 | 8/2009 | Anderson et al. |
| 7,783,427 | B1 | 8/2010 | Woodell et al. |
| 7,839,322 | B2 | 11/2010 | Filias et al. |
| 7,869,305 | B2 | 1/2011 | Anderson et al. |
| 7,903,023 | B2 | 3/2011 | Cornic et al. |
| 8,121,786 | B2 | 2/2012 | Morbey et al. |
| 8,264,377 | B2 | 9/2012 | Griffith |
| 2006/0022866 | A1* | 2/2006 | Walton et al. ............... 342/194 |
| 2008/0158012 | A1 | 7/2008 | Hagan |
| 2008/0169962 | A1 | 7/2008 | Rees et al. |
| 2008/0172178 | A1 | 7/2008 | Anderson et al. |
| 2009/0267538 | A1* | 10/2009 | Mantovani ............... 315/297 |
| 2010/0085235 | A1 | 4/2010 | Meyers et al. |
| 2010/0219988 | A1 | 9/2010 | Griffith |
| 2010/0231705 | A1* | 9/2010 | Yahav et al. ............... 348/115 |
| 2011/0087417 | A1 | 4/2011 | Anderson et al. |
| 2011/0279304 | A1 | 11/2011 | Yonemoto et al. |
| 2011/0288759 | A1 | 11/2011 | Saugnac et al. |
| 2013/0321169 | A1* | 12/2013 | Bateman et al. ............... 340/901 |
| 2013/0342131 | A1 | 12/2013 | Recker et al. |
| 2014/0002278 | A1 | 1/2014 | Boomgaarden et al. |
| 2014/0062755 | A1* | 3/2014 | Kabrt et al. ............... 342/27 |
| 2014/0139366 | A1* | 5/2014 | Moses et al. ............... 342/27 |

OTHER PUBLICATIONS

Thierry Dubois, Eurocopter Researches Low-Cost Obstacle Warning; Aviation International News, May 2012; http://www.ainonline.com/aviation-news/aviation-international-news/2012-05-02 /eurocopter-researches-low-costobstacle-warning, 3 pages.

Toshiki yAMAWAKI et al., 60-GHz Millimeter-Wave Automotive Radar, Fujitsu Ten Tech., No. 11, 1998, 12 pages.

Lacey, "WingWatch: Aircraft Ground Collision Avoidance System," Computer Science and Statistics, retrieved from https://www.scss.tcd.ie/Gerard.Lacey/Gerard_Lacey_Homepage/WingWatch_files/WingWatch%20Overview.pdf, on Apr. 25, 2014, 11 pp.

* cited by examiner

HELICOPTER COLLISION-AVOIDANCE SYSTEM USING LIGHT FIXTURE MOUNTED RADAR SENSORS

PRIORITY CLAIM

This application claims the benefit of U.S. Provisional Application Ser. No. 61/653,297, filed May 30, 2012, the contents of which are hereby incorporated by reference in their entirety. The contents of U.S. Provisional Application Ser. No. 61/706,632 are also hereby incorporated by reference in their entirety.

BACKGROUND OF THE INVENTION

According to a study of civil helicopter accidents, 61% of the accidents occurred during take-off, maneuvering, approach and landing (i.e. while flying low and slow), and 38% of the accidents were caused by lack of adequate pilot situation awareness. Thus, a helicopter warning system that improves pilot awareness of obstacles and terrain while flying low and slow could reduce civil helicopter accidents.

SUMMARY OF THE INVENTION

The present invention provides a helicopter collision-avoidance system. An example embodiment comprises at least one lamp, such as a light emitting diode (LED) lamp, an incandescent lamp, a halogen lamp, an infrared lamp, or the like; a radar emitter configured to emit a radar signal; a radar detector configured to receive a radar return signal associated with reflections of the emitted radar signal that are reflected from an object; and a radio frequency (RF) system configured to wirelessly transmit radar information associated with the received radar return signal to a radar information receiver configured to receive the wirelessly transmitted radar information. The light module is located at one of a plurality of light positions on an external surface of a helicopter.

In another example embodiment, at a radar and light module located on a surface of a helicopter, one or more lamps that output visual light, a radar signal is emitted from a radar emitter, radar return signals corresponding to reflections of the emitted signal from an object are received at a radar detector, and radar information associated with the received radar signal reflections is communicated from a radio frequency (RF) communication system. At a radar information receiver, the radar information transmitted from the RF communication system of the radar and light module is received, and information associated with the received radar information is output via an output device, wherein the outputted radar information indicates presence of obstacles below the helicopter.

BRIEF DESCRIPTION OF THE DRAWINGS

Preferred and alternative embodiments of the present invention are described in detail below, with reference to the following drawings.

DETAILED DESCRIPTION OF THE INVENTION

Figure 1A:
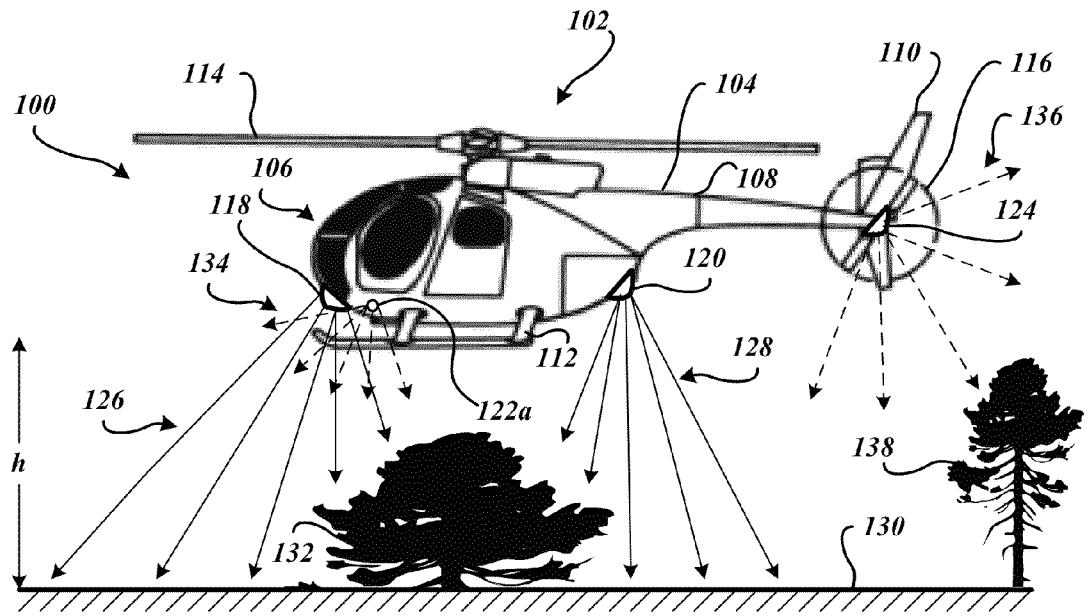
FIG. 1A is a side view of a helicopter with an embodiment of a helicopter collision-avoidance system.
Figure 1B:
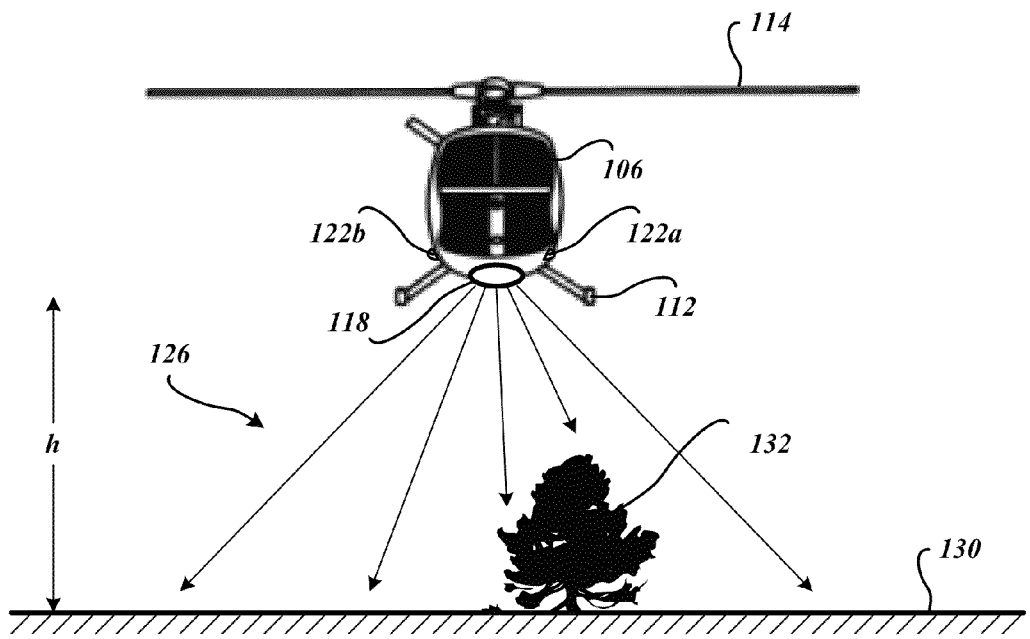
FIG. 1B is a front view of the helicopter with the embodiment of the helicopter collision-avoidance system.

FIGS. 1A and 1B are views of a helicopter 102 with an embodiment of a an exemplary helicopter collision-avoidance system (CAS) 100. The helicopter 102 includes light fixture modules with one or more radar sensors (e.g., radar emitter/detector) included within the modules. The radar sensors in the modules are configured to determine presence of an obstacle that is in proximity to the helicopter 102 based on the radar return signal received by the radar detector. The modules also include one or more lamps that are configured to emit visible or non-visible light for a variety of purposes.

FIG. 1A is a side view of the helicopter 102. FIG. 1B is a front view of the helicopter 102. Generally, the helicopter 102 comprises a fuselage 104 that includes a cabin portion 106, a tail boom portion 108, a tail portion 110, a landing structure 112, such as landing skids or the like, a main rotor 114, and a tail rotor 116. Other parts are typically included, but are not described herein for brevity.

The helicopter 102 further includes a plurality of light modules that include a light assembly fixture portion that is coupleable to a corresponding receptacle on the helicopter 102. Visible light or non-visible light is emitted from these light modules for a variety of purposes. The light may be provided by any suitable type of lamp, such as a light emitting diode (LED) lamp, an incandescent lamp, a halogen lamp, an infrared lamp, or the like.

For example, one or more landing lights 118 may be located at the front undercarriage of the cabin portion 106 to provide light to aid the pilot during night time landings. Some helicopters 102 may have auxiliary landing lights, such as the example auxiliary landing light 120 located at the rear undercarriage of the cabin portion 106. A plurality of colored navigation/position lights, such as the example navigation/position light 122a, may be used to emit colored light understood by others to be a warning signal that indicates a direction of navigation of the helicopter 102 and a current position of the helicopter 102. An anti-collision light 124, may be located at the tail portion 110 of the helicopter 102 and may include a strobe type lamp. The anti-collision light 124 may be used to provide an indication of the location of the tail portion 110 of the helicopter 102. Light may be emitted in a downward direction, at a downward angle, sideways, upwards, or in other directions depending upon the location and/or orientation on the helicopter 102.

A new generation of high intensity LED lamps are becoming increasingly available for aircraft lighting applications. Because of the relatively small size of the LED lamps, in comparison to traditional incandescent or other types of lamps used in traditional aircraft light fixtures, vacant space or room in the light module may be available. In the various embodiments, a radar sensor and other electronic devices are incorporated into the light module to form a radar and light module. The radar and light module is designed to fixably couple to an existing light module receptacle on the exterior surface of the helicopter 102.

Further, the radar and light module is further configured to communicate radar information using a radio frequency (RF) medium or other suitable wireless signal medium. Accordingly, embodiments are particularly suitable to retrofits of existing helicopters 102. Further, since no additional wiring or structural modifications, or at least minimal wiring or structural modifications, are required to add the helicopter collision-avoidance system 100 to a legacy helicopter 102, regulatory review and approval for modifications to the helicopter 102 may be avoided, or at least mitigated.

The radar emitter and radar sensor of a radar and light module are oriented in a direction to provide detection of objects below and in proximity to the helicopter 102. In an example embodiment, the radar sensor in the landing light 118 is oriented in a downward direction so as to emit radar signals 126 in a downward direction. When the emitted radar signals 126 become incident of the ground 130, return signals reflected from the ground 130 are detected such that the height (h) of the helicopter 102 above the ground 130 may be accurately determined. The radar sensors may be oriented in any direction of interest to provide radar coverage out from the helicopter 102 in any direction of interest. For example, but not limited to, the radar sensor may be oriented sideways to provide radar coverage outwardly from the sides, for or rear of the helicopter 102.

Similarly, in the example embodiment, the radar sensor in the auxiliary landing light 120 is oriented in a downward direction so as to emit radar signals 128 in a direction of interest, such as a downward direction. When the emitted radar signals 128 become incident of the ground 130, return signals reflected from the ground 130 are detected such that the height (h) of the helicopter 102 above the ground 130 may be accurately determined.

In some situations, the helicopter 102 may be descending upon or approaching an obstacle or hazard. For example, a bush 132 located below the helicopter 102 may be an obstacle that should be avoided. When the emitted radar signals 126 and/or 128 become incident on the bush 132, return signals reflected from the bush 132 are detected such that the height of the helicopter 102 above the bush 132 may be accurately determined.

In some applications, radar sensors may be included in other lights of the helicopter 102. For example, a radar sensor in each of the navigation/position lights 122a and 122b may be oriented so as to emit radar signals 134 in a direction of interest, such as a downward direction, which may supplement to area of coverage provided by the radar sensor in the landing lights 118 and/or 120.

As another example, a radar sensor in the tail anti-collision light 124 may be oriented so as to emit radar signals 136 in a direction of interest, such as a downward and/or backward direction. Here, when the emitted radar signal 136 becomes incident on the tree 138, return signals reflected from the tree 138 are detected such that the range of the helicopter 102 from the tree 138 may be accurately determined.

Figure 2:
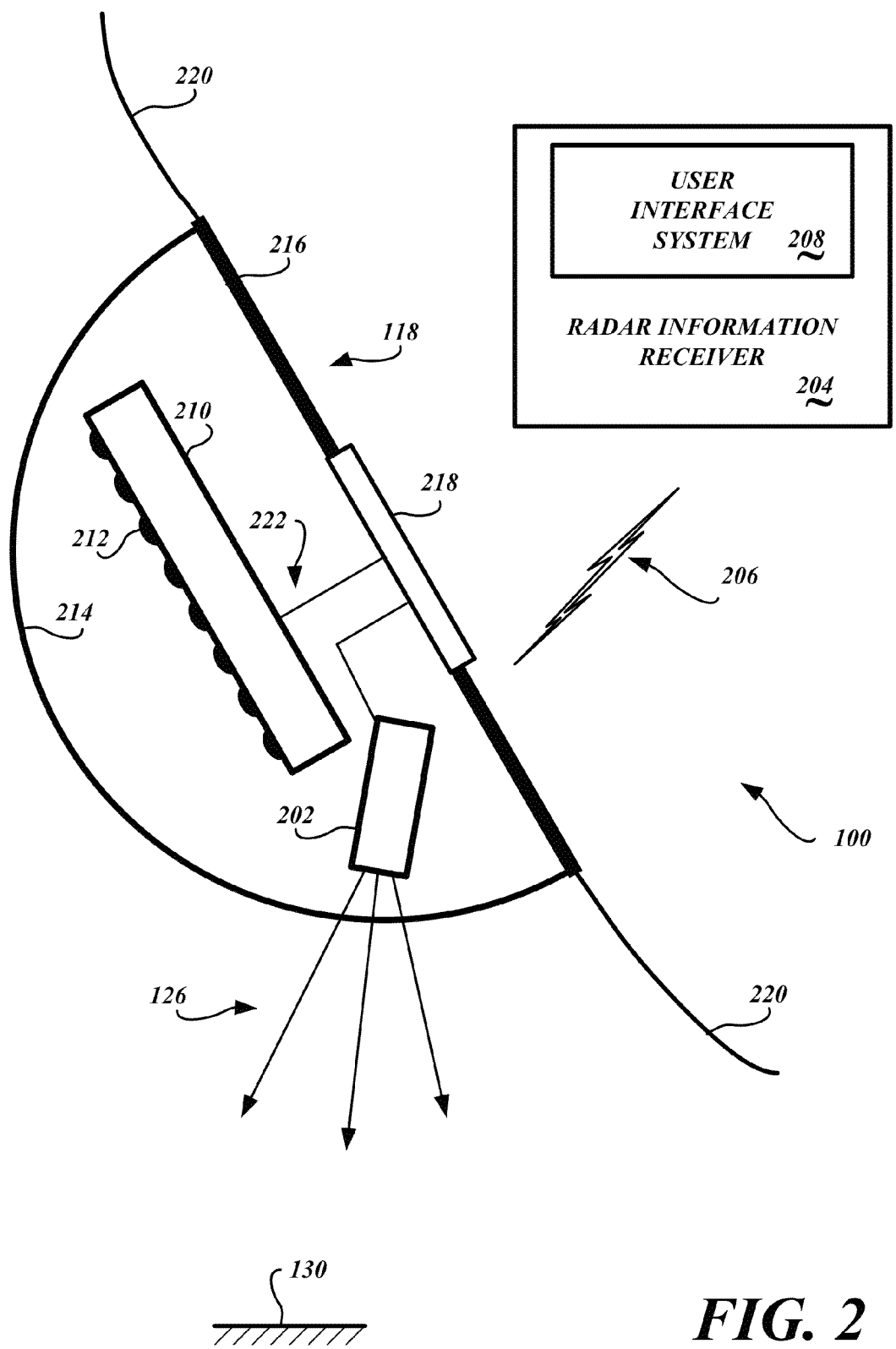
FIG. 2 is a diagram of an example landing light with an embodiment of a helicopter collision-avoidance system with a radar and light module in an example landing light.

FIG. 2 is a block diagram of an example landing light 118 with an embodiment of a helicopter collision-avoidance system 100 with a radar and light module 202 in an example landing light. The radar and light module 202 includes a radar emitter (not shown) that is oriented in an exemplary downward direction so as to emit radar signals 126 in an exemplary downward direction. Information corresponding to received radar returns are returned to a radar information receiver 204, via a wireless signal 206 transmitted from the radar and light module 202. In the event that an obstacle or hazard is detected, a suitable alert, such as a warning, caution, advisory, or the like, is provided to the pilot by the user interface system 208.

The radar information receiver 204 may be located at any suitable location within the helicopter 102. In an example embodiment, the radar information receiver 204 resides in the cabin portion 106 as an integrated electrical system. In some embodiments, the radar information receiver 204 is a portable, stand alone system. In some embodiments, the radar information receiver 204 is incorporated into another electronics system of the helicopter or another system, such as an electronic flight bag. In other embodiments, the radar information receiver 204 is a hand-held device, such as a tablet or the like.

The example landing light 118 includes a lamp fixture 210 with a plurality of LEDs 212 disposed thereon, a lens cover 214, a base 216, and a coupling unit 218. The lens cover 214 may condition light emitted by the LEDs 212, such as by focusing, filtering, or the like. The LEDs 212 may emit visible light (white or colored) and/or non-visible light, such as infrared light or ultraviolet light. In alternative embodiments, other types of lamps may be used in the lamp fixture 210, such as an incandescent lamp, a halogen lamp, an infrared lamp, or the like.

The coupling unit 218 facilitates physical coupling of the landing light 118 to a socket, fixture or the like (not shown) affixed to or installed on the exterior surface 220 of the helicopter 102. The coupling unit 218 further provides for electrical coupling of the lamp fixture 210 to the light control system and the power system (not shown) of the helicopter 102, via connectors 222. Any suitable fastening means may be used to securely affix the example landing light 118 to its respective socket, fixture or the like on the helicopter 102. Power is also provided to the radar and light module 202 via one or more of the connectors 222.

The radar and light module 202 is illustrated as a single element in the example embodiment. In alternative embodiments, the components of the radar and light module 202 (see FIG. 3, for example) may be distributed about the landing light 118 at convenient locations, and/or may be integrated with other components (not shown) of the landing light 118.

Figure 3:
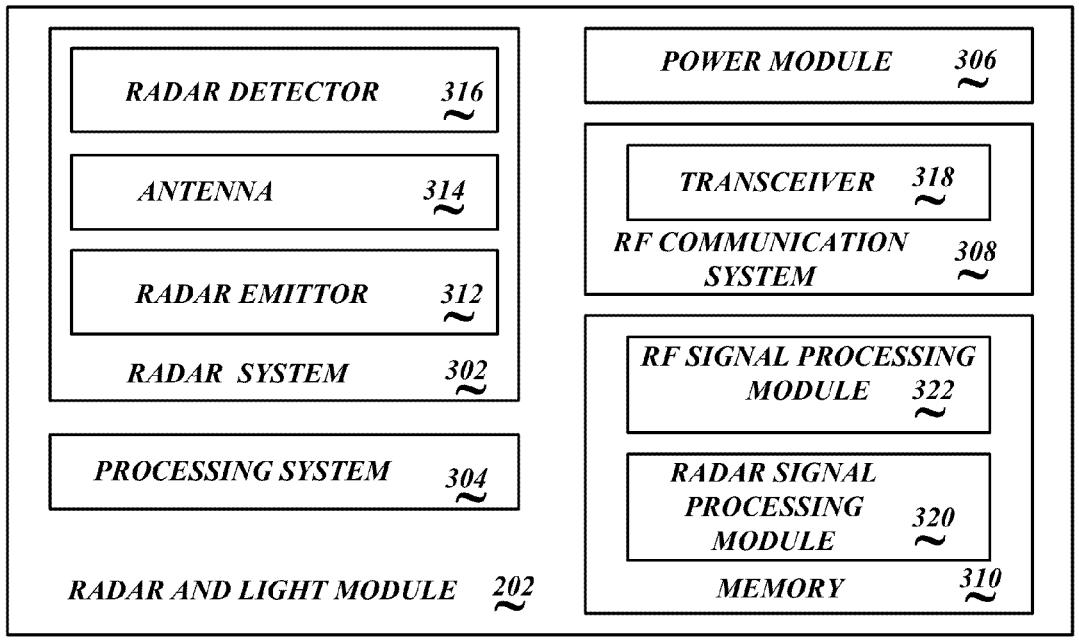
FIG. 3 is block diagram of an example embodiment of a radar and light module.

FIG. 3 is block diagram of an example embodiment of a radar and light module 202. The radar and light module 202 comprises a radar system 302, a processing system 304, an optional power module 306, a radio frequency (RF) communication system 308, and an optional memory 310. The radar system 302 comprises a radar emitter 312, an antenna 314, and a radar detector 316. The RF communication system 308 comprises at least a transceiver 318. In some embodiments, the transceiver 318 may be limited to a suitable RF transmitter device. The memory 310 comprises portions for storing a radar signal processing module 320 and an RF signal processing module 322.

The processing system 304 may be any suitable processor or device. The processing system 304 may be a commercially available processor. In other embodiments, the processing system 304 may be a firmware implementation. The processing system 304 may be a specially designed and fabricated processor.

Other components may be optionally included in the radar and light module 202. Alternatively, one or more of the components of the example radar and light module 202 may reside in other convenient locations within the landing light 118.

The radar emitter 312 is configured to generate the radar signals 126 which are emitted from the antenna 314 in a direction of interest, such as a downward direction, towards the ground 130 (FIGS. 1A, 1B). The antenna 314 is further configured to receive radar return signals that may be reflected from the ground 130 and/or any obstacles or hazards that are within a detection range of the radar emitter 312. The radar detector 316 receives the radar return signals from the antenna 314 and processes the received radar return signals into radar return signal information. The radar return signals are associated with reflections of the emitted radar signal that are reflected from an object, such as the ground 130, the example bush 132, and/or the example tree 138 (FIGS. 1A and 1B).

The processing system 304 is configured to receive the radar return signal information from the radar detector 316. In some embodiments, the processing system 304, executing the radar signal processing module 314, may further process the radar return signal information into information corresponding radar information that identifies the location of and/or range to the ground 130 and/or any detected obstacles or hazards. The processing system 304, executing the RF signal processing module 316, processes the radar return signal information into information that is suitable for communicating in a RF signal by the RF communication system 308.

The RF communication system 308 generates and transmits the RF signal 206 (FIG. 2) that is received by the radar information receiver 204. In some embodiments, the transceiver 318 is a RF transmitter that transits, or communicates, the radar return signal information for a distance that is at least detectable by the radar information receiver 204. In other embodiments, the transceiver 318 is configured to receive RF signals from the radar information receiver 204 or another device. For example, software updates or software modifications to the radar signal processing module 314 and/or the RF signal processing module 316 may be received from time to time.

The power module 306 may be included to provide power to one or more of the components of the radar and light module 202. In some situations, current and/or voltage requirements of the components of the radar and light module 202 may be different from the power (voltage and/or current) provided to illuminate the LEDs 212 of the landing light 118. The power module 306 is configured to receive a sufficient amount of power from the helicopter 102, preferably using existing power supply components and connectors in the case of a retrofit application. The power module 306 may also be configured to condition the received power, such as by changing the voltage and/or current characteristics of the received power. For example, embodiments of the power module 306 may include transformers, DC/DC voltage converters, and/or DC/AC converters. Any suitable power module 306, and/or suitable components, may be used.

The coupling unit 218 preferably comprises a plurality of connectors which may be easily decoupled from mating connectors of the corresponding coupling unit on the helicopter 102 during replacement of the landing light 118. One or more of the connectors in the coupling unit 218 are configured to receive power for lighting of the LEDs 212. In an example embodiment, when the landing light 118 is turned on (actuated) during landing, the radar and light module 202 receives power and becomes operational. When the landing light 118 is off (deactivated), then power is not provided to the radar and light module 202, and is thus not operational.

In other embodiments, power is continuously available over the power connection of the coupling unit 218. Control signals are provided to the landing light 118 which causes illumination of the LEDs 212. In such embodiments, power is continuously available to the radar and light module 202. In some embodiments, the radar and light module 202 is continuously operational, and is therefore detecting for the presence of any obstacles or hazards that are within a detection range of the radar emitter 312.

In other embodiments, the pilot provides a control signal that causes the radar and light module 202 to become operational. Alternatively, or additionally, the control signal that causes the radar and light module 202 to become operational is provided by another electronic system or electronic device, such as, but not limited to, a controller associated with a device that is used for descending and/or landing of the helicopter 102.

Figure 4:
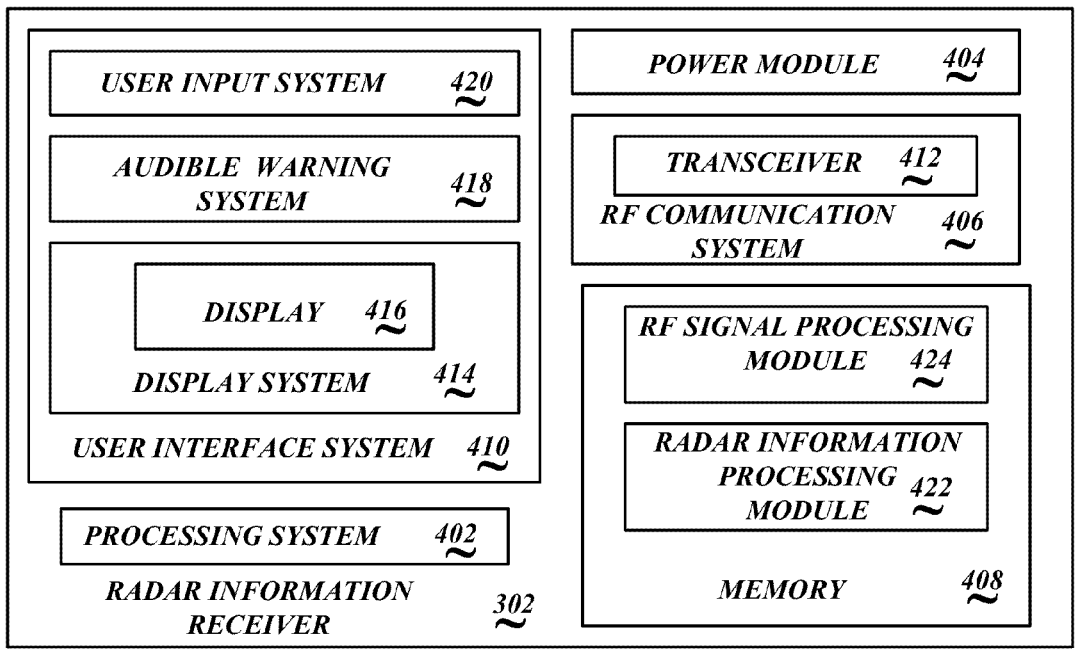
FIG. 4 is block diagram of an example embodiment of a radar information receiver.

FIG. 4 is block diagram of an example embodiment of a radar information receiver 302. The radar information receiver 302 comprises a processing system 402, a power module 404, a RF communication system 406, a memory 408, and a user interface system 410. The RF communication system 406 comprises a transceiver 412. The user interface system 401 comprises a display system 414 with an optional display, an optional audible warning system 418, and an optional user input 420. The memory 408 comprises portions for storing the radar information processing module 422 and the RF signal processing module 424.

The processing system 402 may be any suitable processor or device. The processing system 402 may be a commercially available processor. In other embodiments, the processing system 402 may be a firmware implementation. The processing system 402 may be a specially designed and fabricated processor. In some embodiments, the processing system 402 may be a component of another system or device which receives the radar information from the radar and light module 202 or from the RF communication system 406.

Other components may be optionally included in the radar information receiver 302. Alternatively, one or more of the components of the example radar information receiver 302 may reside in other convenient locations within the helicopter 102.

The RF communication system 406 receives the RF signal 206 (FIG. 2) that is transmitted by the radar and light module 202. In some embodiments, the transceiver 412 is a RF receiver that receives the communicated radar return signal information for a distance that is at least within the broadcast range of the radar and light module 202. In other embodiments, the transceiver 412 is configured to transmit RF signals to the radar and light module 202 or another device. For example, updates or modifications to the radar signal processing module 314 and/or the RF signal processing module 316 in the radar and light module 202 may be transmitted from time to time.

The processing system 402, executing the RF signal processing module 424, processes the RF signal information received from the radar and light module 202 into radar information. The processing system 402, executing the radar information processing module 422, further processes the radar information into information that is suitable for presentation to a crew of the helicopter 102.

In some embodiments, the optional user interface system 414 may be used to provide warning and/or advisories of any detected obstacles or hazards that are within a detection range of the radar emitter 312 in the radar and light module 202. In an example embodiment, the processing system 402 generates graphical display information that is presentable on the optional display 416. The graphical information presented on the display 412 may be a plan view of a region of space below the helicopter 102, similar to the plan view provided by traditional avionics radar systems of the region of space in front of an aircraft or the helicopter 102. A profile view, or vertical slice, may also be generated and visually presented on the display 416. Accordingly, the crew viewing the display 416 appreciates the nature of any detected obstacles or hazards that are within a detection range of the radar emitter 312.

Alternatively, or additionally, the graphical display information may be communicated to a remote display, and/or may be communicated to another system. For example, the graphical display information may be communicated to an electronic flight bag or the like. Alternatively, or additionally, the graphical display information may be communicated to an onboard radar system.

In other embodiments, the radar information itself is communicated to another system with a processor that is configured to generate the graphical display information using the received radar information. For example, but not limited to, the radar information may be communicated to an onboard radar system which controls one or more displays. Alternatively, or additionally, unprocessed radar information may be communicated to the onboard radar system in embodiments of the radar information receiver 302 that do not include the radar information processing module 422.

In some embodiments, the display 416 may be a warning light, indicator or the like. For example, the display system 414 may cause actuation of a red and/or flashing light in the cabin portion 106 in the event that any obstacles or hazards that are within a detection range of the radar emitter 312 and/or are within a distance threshold from the helicopter 102.

In some embodiments, the audible warning system 418 may be configured to issue an audible warning or alert to the crew of the helicopter 102 in the event that any obstacles or hazards are within a detection range of the radar emitter 312 and/or are within a distance threshold from the helicopter 102. The audible warning system 418 may be located at a convenient location within the cabin portion 106 of the helicopter 102 (FIG. 1). In other embodiments, a signal may be communicated to another audible warning system so that an audible alert or warning may be issued.

The user input system 420 is configured to receive input from the crew of the helicopter 102 or by another individual, such as the maintenance crew. In some embodiments, the user input system 420 may be used to input a command that actuates the operation of the radar information receiver 302 and/or one or more of the radar and light modules 202. Additionally, or alternatively, the crew, an operator, or other person, may set and/or adjust a distance threshold that is used to generate alerts, such as warnings, cautions, advisories, or the like in the event that any obstacles or hazards that are within a distance threshold from the helicopter 102.

The optional power module 404 provides power to the components of the radar information receiver 302. When a helicopter 102 is retrofitted with an embodiment of the helicopter collision-avoidance system 100, a single and conveniently accessible source of power on the helicopter 102 may be provided to the power module 404. The power module 404 may then provide power to one or more of the components of the radar information receiver 302.

In some situations, current and/or voltage requirements of the components of the radar information receiver 302 may be different from the accessed power (voltage and/or current). In such instances, the power module 404 is configured to condition the received power, such as by changing the voltage and/or current characteristics of the received power. For example, embodiments of the power module 404 may include transformers, DC/DC voltage converters, and/or DC/AC converters. Any suitable power module 404, and/or suitable components, may be used as is understood by one skilled in the art To provide greater radar coverage in a direction of interest, such as, but not limited to, below the helicopter 102, a plurality of radar and light modules 202 in other light fixtures located about the helicopter 102 may be employed. In such embodiments, an identifier associated with each communicated RF signal 206 (FIG. 2) is transmitted by the plurality of different radar and light modules 202. Accordingly, radar information can be associated with a particular region around the helicopter 102 since the source of the detected radar information is known. Further, embodiments may be configured to process the radar information received from the plurality of radar and light modules 202 in an integrated fashion. In such embodiments, a plan view of the region of airspace about the helicopter 102 may be generated and then displayed on the display 416 or on another suitable display device.

Alternatively, or additionally, one or more other radar units may be located on the helicopter 102 that are configured to provide radar information to the radar information receiver 302. The radar information receiver 302 may then integrate radar information received from those other units with radar information received from one or more of the radar and light modules 202.

The radar and light module 202 may also include navigation/position lights 122a, 122b, the tail anti-collision light 124, and/or the auxiliary landing light 120. In such light modules, the use of LEDs has provided additional unused space wherein a radar and light module 202 may be integrated into the light. Then, the navigation/position lights 122a, 122b, the tail anti-collision light 124, and/or the auxiliary landing light 120, each having the radar and light module 202 integrated therein, may be used to replace a corresponding legacy light. Accordingly, in the event that any obstacles or hazards that are within a detection range of the radar emitter 312 and/or are within a distance threshold from the helicopter 102 which are detected by the radar and light module 202 in these other lights may be used to generate suitable warning and/or alerts to the crew of the helicopter 102.

The fields of view (FOVs) of the radar system 302 provide ideal coverage of a region of space below the helicopter 102. The FOV parameters are derived from typical accident geometry and functional requirements. Any blind spots surrounding the helicopter 102 are based on the FOV of one candidate technology (radar) and constraints associated with placing the radars inside the light modules. Other FOVs are possible, depending upon where the radar system 302 is placed within the light module.

The thresholds for sensor FOV may be assessed based on the particular region of space required for the landing of the helicopter 102. Further, sensor FOVs may be defined based on regulatory requirements which specify a minimum distance threshold from hazards or obstacles during the landing of the helicopter 102.

In an example embodiment, the radar and light module 202 and the radar information receiver 302 include OneWireless™ devices produced by Honeywell, Inc. and adapted to CAS system requirements. Special antennas are used with these devices to ensure proper link power budget. Other wireless protocols may be used, such as 802.11 (WLAN) radio technology.

Figure 5:
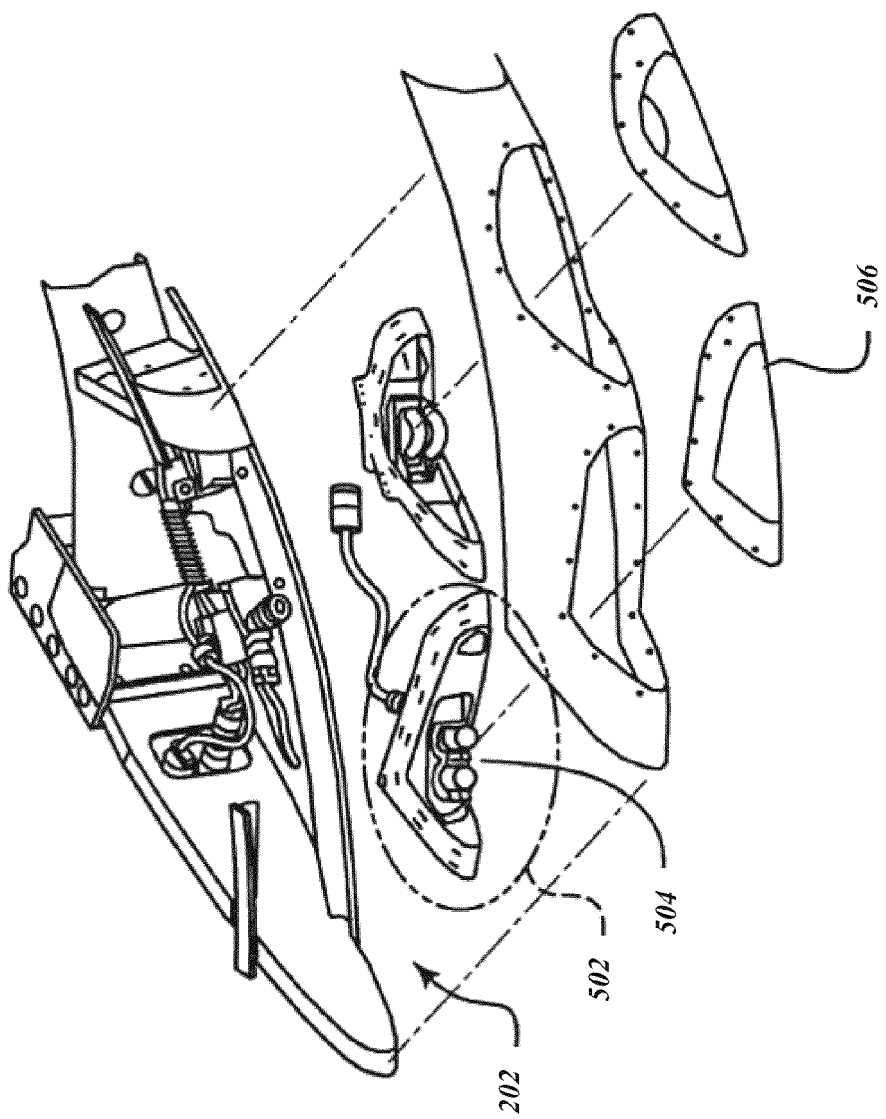
FIG. 5 shows an example light compartment of an example radar and light module.

FIG. 5 shows an example light compartment 502 of an example radar and light module 202, such as, but not limited to, the navigation/position light 122a (or 122b, or another navigation/position light). The compartment 502 includes a position light 504 with two LED assemblies or two halogen bulbs (based on the lighting version requirements). The light compartment 502 includes:

Antenna—e.g., 2-4 cm. The antenna is located behind a glass cover 506; the other parts are made of aluminum or composites, which would increase signal attenuation.

radar and light module 202 with an antenna mounted on or in the glass 506.

In example embodiments, the radar system 302 is an industrial, scientific, and medical (ISM) 2.4 GHz band and distance-measurement radar with related electronic gear. In one embodiment, a sensor node antenna for the ISM band wireless communication of the radar information receiver 204 is included in the position-light compartment. In one embodiment, the antenna is placed under a light glass light cover, which is expected to be transparent for RF signal communication. The antenna also provides sufficient gain for the errorless communication with the radar information receiver 204.

In some embodiments, a directional antenna is used. The directional antenna requires more space than omnidirectional dipoles do. Basically, there are at least two suitable directional antenna types, Yagi and patch antennas. Both provide directional characteristics, though any suitable antenna 314 may be used. The Yagi is flat and long in the direction of the main lobe; the patch antenna requires more space in the plane perpendicular to the main lobe axis. This means that Yagi antennas' front elements could interfere with the position light. On the other hand, the patch antenna requires more space between position-light components (LED reflectors, radar antenna lens).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A helicopter collision-avoidance system comprising:
   a radar and light module comprising:
      at least one lamp configured to emit light;
      a radar emitter configured to emit a radar signal;
      a radar detector configured to receive a radar return signal associated with reflections of the emitted radar signal that are reflected from an object; and
      a first radio frequency (RF) system configured to wirelessly transmit radar information associated with the received radar return signal,
      wherein the radar and light module is located at one of a plurality of light positions on an external surface of a helicopter;
   a radar information receiver comprising:
      a second RF system configured to receive the radar information wirelessly transmitted from the radar and light module; and
      a user interface system configured to output information associated with the received radar information.

2. The system of claim 1, wherein at least one of the radar information receiver and the radar and light module comprises a processing system configured to determine presence of the object that is in proximity to the helicopter based on the radar return signal received by the radar detector.

3. The system of claim 1, wherein the radar and light module comprises a power module configured to receive power at a first voltage configured to operate the lamp, and configured to condition the received power to a second voltage used by at least one of the radar emitter, the radar detector, and the first RF system.

4. The system of claim 1, wherein the first RF system comprises a transceiver configured as a transmitter, wherein the transmitter transmits the radar information to the radar information receiver via a wireless RF signal.

5. The system of claim 4, wherein the first RF system transceiver is further configured as a receiver, wherein the receiver receives software updates via the wireless RF signal.

6. The system of claim 1, wherein the user interface system provides at least one of an audio and a visual alert to a crew of the helicopter.

7. The system of claim 1, wherein the radar and light module is a landing light.

8. The system of claim 1, wherein the radar and light module is a navigation/position light.

9. The system of claim 1, wherein the radar and light module is an anti-collision light located at a tail portion of the helicopter.

10. The system of claim 1, wherein the radar and light module is a first radar and light module located at a first light position on the external surface of the helicopter, and further comprising:
    a second radar and light module comprising:
       at least one light emitting diode (LED);
       a second radar emitter configured to emit a second radar signal;
       a second radar detector configured to receive a second radar return signal associated with reflections of the emitted second radar signal that are reflected from the object; and
       a third radio frequency (RF) system configured to wirelessly transmit second radar information associated with the received second radar return signal,
    wherein the second radar and light module is located at a second light position on the external surface of the helicopter.

11. A method comprising:
    at a radar and light module located on a surface of a helicopter,
       outputting light from one or more lamps;
       emitting from a radar emitter a radar signal;
       receiving at a radar detector radar return signals corresponding to reflections of the emitted radar signal from an object; and
       wirelessly transmitting from a radio frequency (RF) communication system radar information associated with the received radar signal reflections;
    at a radar information receiver,
       receiving the radar information transmitted from the RF communication system of the radar and light module; and
       outputting information associated with the received radar information via an output device,
    wherein the outputted radar information indicates presence of obstacles below the helicopter.

12. The method of claim 11, wherein the radar information receiver resides in a cabin portion of the helicopter.

13. The method of claim 11, wherein the radar information receiver is portable.

14. The method of claim 11, wherein the radar information receiver is located in a hand-held device.

15. The method of claim 11, wherein the radar and light module comprises landing lights.

16. The method of claim 11, wherein the radar and light module comprises navigation/position lights.

17. A helicopter collision-avoidance system radar and light module comprising:
    at least one light emitting diode (LED);
    a radar emitter configured to emit a radar signal;
    a radar detector configured to receive a radar return signal associated with reflections of the emitted radar signal that are reflected from an object; and
    a radio frequency (RF) system configured to wirelessly transmit radar information associated with the received radar return signal to a radar information receiver configured to receive the wirelessly transmitted radar information, wherein the radar and light module is located at one of a plurality of light positions on an external surface of a helicopter.

18. The module of claim 17, wherein the radar information receiver includes a user interface system configured to output information associated with the received radar information.

19. The module of claim 17, wherein the radar and light module is a landing light of the helicopter.

20. The module of claim 17, wherein the radar and light module is a navigation/position light.

* * * * *